June 26, 1923.

E. N. TWOGOOD 1,460,001

SHAFT COUPLING

Filed July 3, 1920

Inventor:
Ernest N. Twogood,
by
His Attorney.

Patented June 26, 1923.

1,460,001

UNITED STATES PATENT OFFICE.

ERNEST N. TWOGOOD, OF SCHENECTADY, NEW YORK, ASSIGNOR TO GENERAL ELECTRIC COMPANY, A CORPORATION OF NEW YORK.

SHAFT COUPLING.

Application filed July 3, 1920. Serial No. 393,805.

*To all whom it may concern:*

Be it known that I, ERNEST N. TWOGOOD, a citizen of the United States, residing at Schenectady, county of Schenectady, State of New York, have invented certain new and useful Improvements in Shaft Couplings, of which the following is a specification.

The present invention relates to couplings for connecting together adjacent shaft ends for transmitting power from one to the other. For certain applications it is desirable to have a coupling capable of a limited degree of torsional and lateral flexibility and which will permit of axial adjustments of the shafts relatively to each other and take care of any slight inaccuracies in shaft alignment, and the object of my present invention is to provide an improved structure and arrangement in a coupling of this type.

For a consideration of what I believe to be novel and my invention, attention is directed to the accompanying description and the claims appended thereto.

Figure 1:
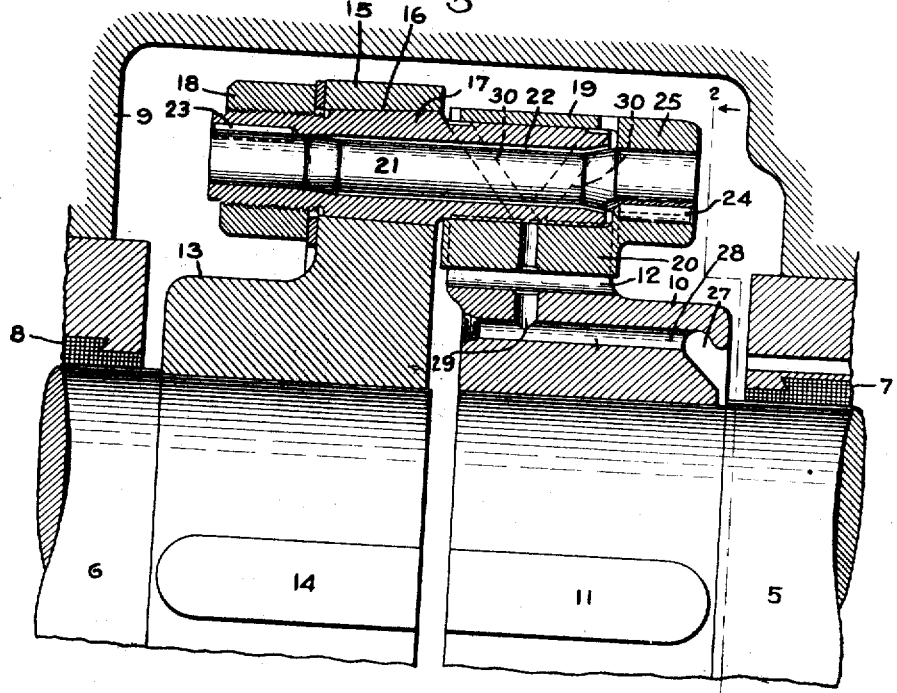
Figure 2:
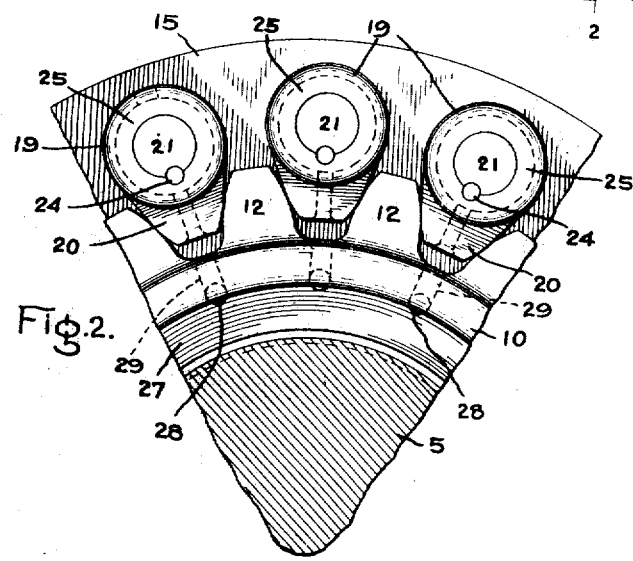

In the drawing, Fig. 1 is an axial sectional view of a coupling embodying my invention, and Fig. 2 is a section taken on line 2—2, Fig. 1. In connection with the drawing, it will be understood that Fig. 1 shows only the upper half of the coupling, the lower portion of the shaft and coupling being broken away, as in the drawing it would appear as a duplicate of that shown, and that Fig. 2 shows only a segment of the complete annular coupling.

Referring to the drawing, 5 and 6 indicate adjacent shaft ends to be coupled together, 7 and 8 bearings which carry the shafts, and 9 a housing for the coupling.

Shaft 5 carries a coupling member or part comprising a sleeve 10 fixed on the end of shaft 5 by a key as indicated at 11 and provided with radially projecting members or teeth 12, somewhat of the order of gear teeth. This forms one part or member of the coupling.

The other part or member of the coupling is carried by shaft 6 and comprises a sleeve 13 keyed to the end of shaft 6 by a key as indicated at 14 and provided with an annular radially extending flange 15. In flange 15 is a ring of circumferentially spaced holes 16 in which are fixed one end of a series of supporting pins 17. Holes 16 are preferably tapered and pins 17 are provided with tapered ends which fit into holes 16 and are drawn tightly therein and held by nuts 18 which screw onto threaded ends of the pins. This firmly anchors supporting pins 17 in flange 15. Mounted on the projecting end of each supporting pin 17 is a sleeve 19 having a radially projecting member or tooth 20 somewhat of the form of a gear tooth, each tooth 20 fitting between two of the teeth 12. In other words, there is formed in substance an internal and an external gear with all their teeth in mesh. Sleeves 19 are loosely mounted on the ends of pins 17 and are connected thereto by a torsional and flexible means which permits of adjustments taking place between the two parts of the coupling. Preferably these connections comprise short torsional pins 21, each having one end connected to a sleeve 19 and the other connected to flanges 15. To this end supporting pins 17 are made with axial openings 22 through them and torsional pins 21 extend through such openings, the ends of pins 21 remote from shaft 5 being fixed to the ends of pins 17 by suitable means such as keys 23 and the other ends being fixed to the outer ends of sleeves 19 by suitable means such as keys 24. Sleeves 19 have heads 25 located beyond the ends of pins 17, the ends of pins 21 being fastened in such heads. The axial openings 22 in supporting pins 17 are of greater diameter than torsional pins 21 and the pins are held in spaced relation to the walls of openings 22 so they may flex therein to a limited extent.

For lubricating the coupling I provide an oil groove 27 adapted to catch oil from bearing 7 and conduct it by way of passages 28 and 29 to the bearings between pins 17 and sleeves 19. Oil grooves for such bearings are indicated at 30. Oil from passage 29 also lubricates the teeth.

With the above-described arrangement it will be seen that shaft 5 is connected to shaft 6 through meshing teeth 12 and 20 and the supporting pins 17, torsion pins 21 serving to hold sleeves 19 from turning on pins 17. In operation the torque is transmitted between the shafts through teeth 12 and 20, sleeve 19, supporting pins 17 and flange 15. The engagement of teeth 12 with teeth 20 acts as a lever tending to turn each sleeve 19 on its supporting pins 17 and this is resisted by the torsion pins 21. In case of excess load torsion pins 21 will all twist somewhat permitting one shaft to turn slightly relatively to the other. In case of unequal distribution of the load among teeth 12 and 20, any pin 21 may twist slightly individually whereby the corresponding tooth 20 will will move, its sleeve 19 turning on supporting pin 17 and thus relieving the excess pressure on such tooth. It is thus insured that the load will be equally distributed among the teeth of the coupling. Also in case of slight misalignment of shafts 5 and 6 the teeth 12 and 20 can rock on each other to take care of such misalignment without in any way affecting the coupling. By the teeth sliding axially on each other the shafts may adjust themselves axially relatively to each other.

The supporting pins 17 form a firm rigid support for sleeves 19 and serve to hold teeth 20 in axial alignment with teeth 12 and transmit the torque from teeth 20 to flange 15.

The teeth 12 are made quite long and extend well up between teeth 20 so that in case the torsion pins 21 should fail the teeth 12 will wedge against teeth 20 and sleeve 19 and still maintain the coupling in operative condition so that it may be used temporarily until repairs can be made.

One application to which my invention is well adapted is in connection with double reduction gearing wherein power is transmitted from a driving pinion to a driven gear wheel through two or more sets of intermediate gear wheels which transmit the load in parallel from the pinion to the gear wheel. In such a gearing it is desirable that each intermediate set of gear wheels transmits its proper share of the load and by arranging one of my flexible couplings in the shaft of each intermediate set of gear wheels this will be assured for in case any set tends to carry more than its share of the load the coupling in its shaft will yield circumferentially thereby effecting circumferential adjustment of the gear wheels of the set relatively to each other which will relieve the tooth pressure on such set and transfer the excess load to the other set or sets.

The coupling although embodying the comparatively long torsion pins 21 is nevertheless, due to the arrangement of the parts, short and compact, occupying no more space than the usual coupling. At the same time it is comparatively simple to build and assemble and can be manufactured at a reasonable cost.

In accordance with the provisions of the patent statutes, I have described the principle of operation of my invention, together with the apparatus which I now consider to represent the best embodiment thereof; but I desire to have it understood that the apparatus shown is only illustrative, and that the invention may be carried out by other means.

What I claim as new and desire to secure by Letters Patent of the United States, is,—

1. In a coupling for adjacent shaft ends, the combination of a set of outwardly projecting members, a set of inwardly projecting members, said members engaging each other, and means connecting said sets to the shaft ends, the means for connecting one of said sets comprising torsional shaft members.

2. In a coupling for adjacent shaft ends, interleaving contacting members for transmitting power, and means connecting them to the shaft ends, said means comprising torsional members whereby said contacting members may adjust themselves individually or as a whole.

3. In a coupling for adjacent shaft ends, interleaving contacting members for transmitting power, and means connecting them to the shaft ends, said means comprising axially extending torsional members adapted to flex laterally.

4. In a coupling for adjacent shaft ends, engaging members which directly engage each other for transmitting power, and means including axially extending torsional shaft members for connecting said engaging members to the respective shaft ends.

5. In a coupling for adjacent shaft ends, the combination of a set of outwardly projecting members, a set of inwardly projecting members which interleave therewith, and means connecting said sets to the shaft ends, the means for connecting one of said sets comprising torsional shafts.

6. In a coupling for adjacent shaft ends, the combination of a set of radially extending teeth, means rigidly connecting them to one shaft end, a second set of radially extending teeth which meshes with the first set, and torsional means connecting the second set of teeth to the other shaft end.

7. In a coupling for adjacent shaft ends, the combination of a set of radially extending teeth, means rigidly connecting them to one shaft end, a second set of radially extending teeth which meshes with the first set, and torsional means for individual teeth of the second set for connecting them to the other shaft end.

8. In a coupling for adjacent shaft ends, the combination of a set of radially extending teeth, means rigidly connecting them to one shaft end, a second set of radially extending teeth which meshes with the first set, and a torsional means for each tooth of the second set for connecting it to the other shaft end.

9. In a coupling for adjacent shaft ends, the combination of a set of radially extending teeth, means rigidly connecting them to one shaft end, a second set of radially extending teeth which meshes with the first set, and torsional pins connecting the teeth of said second set to the other shaft end.

10. In a coupling for adjacent shaft ends, the combination of radially projecting teeth carried by one shaft end, axially extending torsional pins carried by the other shaft end, and radially projecting teeth fixed on said pins and meshing with the first named teeth.

11. In a coupling for adjacent shaft ends, the combination of radially projecting members carried by one shaft end, a flange on the other shaft end, axially extending supporting pins fixed to said flange, sleeves mounted on said pins, projecting members carried by said sleeves which interleave with the first named projecting members, and torsion means connecting said sleeves to said supporting pins.

12. In a coupling for adjacent shaft ends, the combination of radially projecting members carried by one shaft end, a flange on the other shaft end, axially extending hollow supporting pins fixed to said flange, sleeves mounted on said pins, projecting members carried by said sleeves which interleave with the first named projecting members, and torsion shafts located in said supporting pins for connecting said sleeves to the supporting pins.

13. In combination, a shaft, a sleeve thereon provided with radially extending teeth, a second shaft, a flange thereon, hollow axially-extending supporting pins fixed to said flange and spaced circumferentially around it, sleeves mounted loosely on said supporting pins, said sleeves being provided with radially extending teeth which mesh with said first named teeth, and torsion pins which extend through said supporting pins in spaced relation thereto and have one end connected to such pins and the other end connected to said sleeves.

In witness whereof, I have hereunto set my hand this first day of July, 1920.

ERNEST N. TWOGOOD.